United States Patent [19]
Lee

[11] 3,857,839
[45] Dec. 31, 1974

[54] FOR CYCLISING 1-ARYLOXY-3 BETA-SUBSTITUTED ETHYLAMINO-2-PROPANOLS

[75] Inventor: Stanley Arnold Lee, Macclesfield, England

[73] Assignee: Imperial Chemical Industries Limited, London, England

[22] Filed: Oct. 19, 1972

[21] Appl. No.: 299,174

Related U.S. Application Data

[63] Continuation-in-part of Ser. No. 44,644, June 8, 1970, Pat. No. 3,713,890.

[30] Foreign Application Priority Data
June 20, 1969 Great Britain .................... 31255/69
Oct. 13, 1969 Great Britain .................... 50130/69

[52] U.S. Cl......... 260/247.7 C, 260/570.7, 424/248
[51] Int. Cl............................................. C07d 87/32
[58] Field of Search ............... 260/247.5 R, 247.7 C

[56] References Cited
UNITED STATES PATENTS
615,488  12/1898  Knorr................................. 260/247
3,308,121  3/1967  Gannon et al. ............... 260/247.5 R
3,712,890  1/1973  Lee .............................. 260/247.7 C FOREIGN PATENTS OR APPLICATIONS
1,138,405  1/1969  Great Britain Primary Examiner—Donald G. Daus
Assistant Examiner—Jose Tovar
Attorney, Agent, or Firm—Cushman, Darby & Cushman

[57] ABSTRACT

A process for the manufacture of 2-aryloxymethyl morpholine derivatives, known to possess useful central nervous depressant activity, by the cyclisation of the corresponding 1-aryloxy-3-$\beta$-substituted ethylamino-2-propanol derivative in which the $\beta$-substituent is a displaceable radical. This process avoids the use of hazardous complex metal hydrides employed in the prior art process.

6 Claims, No Drawings

FOR CYCLISING 1-ARYLOXY-3 BETA-SUBSTITUTED ETHYLAMINO-2-PROPANOLS

This application is a continuation-in-part of application Ser. No. 44,644 filed 8 June, 1970, now U.S. Pat. No. 3,713,890, issued Jan. 23, 1973.

This invention relates to a new process for the manufacture of morpholine derivatives which possess valuable therapeutic properties, for example central nervous depressant and thymoleptic properties.

In United Kingdom Patent Specification No. 1,138,405 there are described and claimed certain novel morpholine derivatives which possess the above-mentioned valuable therapeutic properties, and there are also described and claimed certain chemical processes for the manufacture of said morpholine derivatives. The claimed chemical processes suffer from the disadvantage that they involve the use of a complex metal hydride, for example lithium aluminium hydride, which hydride is hazardous by virtue of a fire and/or explosion risk especially when used on a large scale suitable for commercial manufacture.

It has now been found that the said morpholine derivatives, which possess valuable therapeutic properties, and also certain N-α-arylalkyl derivatives thereof which are useful as intermediates in one of the processes described and claimed in said specification, may conveniently be obtained from readily obtainable starting materials, under conditions which are not hazardous by virtue of a fire and/or explosion risk when used on a large scale.

According to the invention there is provided a process for the manufacture of morpholine derivatives of the formula:

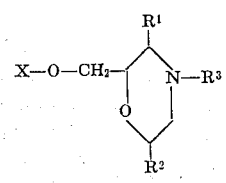

wherein $R^1$ and $R^2$, which may be the same or different, stand for hydrogen or for alkyl radicals, wherein $R^3$ stands for hydrogen or for an alkyl, alkenyl, cycloalkyl or α-arylalkyl radical, and wherein X stands for an aryl radical which may optionally be substituted, and the acid-addition salts thereof, which comprises the cyclisation of a compound of the formula:

wherein X, $R^1$, $R^2$ and $R^3$ have the meanings stated above and wherein Z stands for a displaceable radical, or an acid-addition salt thereof, whereafter if desired the morpholine derivative in free base form is reacted with an acid in order to form an acid-addition salt thereof.

It is to be understood that the above definition of morpholine derivatives encompasses all possible stereoisomers thereof, and mixtures thereof.

A suitable value for $R^1$ and $R^2$ when it stands for an alkyl radical is, for example, an alkyl radical of up to 3 carbon atoms, for example the methyl radical.

A suitable value for $R^3$ when it stands for an alkyl radical is, for example, an alkyl radical of up to 6 carbon atoms, for example the methyl, ethyl, isopropyl, n-propyl, s-butyl or t-butyl radical.

A suitable value for $R^3$ when it stands for an alkenyl radical is, for example, an alkenyl radical of up to 6 carbon atoms, for example the allyl radical.

A suitable value for $R^3$ when it stands for a cycloalkyl radical is, for example, a cycloalkyl radical of up to 5 carbon atoms, for example the cyclopropyl, cyclobutyl or cyclopentyl radical.

A suitable value for $R^3$ when it stands for an α-arylalkyl radical is, for example, an alkyl radical of up to 6 carbon atoms which is substituted on the α-carbon atom by a phenyl radical, for example the benzyl radical.

A suitable value for X is, for example, a phenyl or naphthyl radical which is unsubstituted or which is substituted by one or more substituents, and particularly one or two substituents, selected from halogen atoms, for example fluorine, chlorine and bromine atoms; alkyl, alkoxy and alkylthio radicals, for example alkyl, alkoxy and alkylthio radicals each of up to 10 carbon atoms, for example methyl, ethyl, isopropyl, n-butyl, t-butyl, t-amyl, methoxy, ethoxy, n-propoxy, isopropoxy, n-butoxy, isobutoxy, n-heptyloxy and methylthio radicals; halogenoalkyl and halogenoalkoxy radicals, for example halogenoalkyl and halogenoalkoxy radicals each of up to 5 carbon atoms, for example trifluoromethyl and 2,2-dichloro-1,1-difluoroethoxy radicals; alkenyl, alkenyloxy, alkynyloxy and cycloalkoxy radicals, for example alkenyl, alkenyloxy, alkynyloxy and cycloalkoxy radicals each of up to 6 carbon atoms, for example allyl, allyloxy, propargyloxy and cyclopentyloxy radicals; aryl, aryloxy, alkylaryloxy, aralkyl and aralkoxy radicals, for example aryl, aryloxy, alkylaryloxy, aralkyl and aralkoxy radicals each of up to 10 carbon atoms, for example phenyl, phenoxy, 4-tolyloxy, benzyl and benzyloxy radicals; alkoxyalkyl radicals, for example alkyl radicals of up to 5 carbon atoms each of which is substituted by an alkoxy radical of up to 5 carbon atoms, for example methoxymethyl, ethoxymethyl and n-propoxymethyl radicals; hydroxy and methylenedioxy radicals; and alkylene radicals, for example alkylene radicals of 3 or 4 carbon atoms, for example trimethylene and tetramethylene radicals (that is, those radicals which together with the aryl radical X forms an indanyl or tetrahydronaphthyl radical, for example the 4-indanyl, 5-indanyl, 5,6,7,8-tetrahydro-1-naphthyl or 5,6,7,8-tetrahydro-2-naphthyl radical).

A particularly preferred value for X is phenyl or naphthyl which is unsubstituted or phenyl which is substituted by one or two substituents selected from halogen, alkyl, alkoxy and alkylthio each of up to 10 carbon atoms, trifluoromethyl, alkenyl and alkenyloxy each of up to 6 carbon atoms, phenyl, phenoxy, benzyloxy, hydroxy, indanyl or tetrahydronaphthyl.

Suitable acid-addition salts of the morpholine derivatives which may be manufactured by the process of the invention are, for example, acid-addition salts derived from inorganic or organic acids, for example hydrochlorides, hydrobromides, phosphates, sulphates, oxalates, lactates, tartrates, acetates, gluconates, salicylates, citrates, ascorbates, benzoates, β-naphthoates, adipates or 1,1-methylene-bis-(2-hydroxy-3-naphthoates), or acid-addition salts derived from acidic synthetic resins, for example sulphonated polystyrene resins, for example "Zeo-Karb" 225 ("Zeo-Karb" is a Trade Mark).

A suitable value for Z is, for example, a halogen atom, for example the chlorine or bromine atom, or a sulphonyloxy radical, for example a radical of the formula $-OSO_2OR^4$ wherein $R^4$ stands for hydrogen or for a lower alkyl or an aryl radical, for example the methyl, ethyl, phenyl or p-tolyl radical.

A suitable acid-addition salt of the starting material is, for example, a salt with a mineral acid, for example a hydrochloride, hydrobromide or sulphate.

The cyclisation process of the invention may be carried out in a diluent or solvent, for example water, or an alcohol, for example methanol, ethanol, isopropanol, n-butanol, t-butanol or ethylene glycol, or an ether, for example diethyl ether, tetrahydrofuran or dioxan, or an aromatic hydrocarbon, for example benzene or toluene, or a mixture of any of the abovementioned solvents, for example aqueous ethanol, aqueous methanol, aqueous dioxan or the twophase water-toluene system; it may be carried out at ambient temperature or at an elevated temperature, for example at a temperature up to the boiling point of the diluent or solvent, for example at a temperature of between 0° and 100°C., for example at between 40° and 60°C.; and it may be carried out in the presence of a base, for example an alkali or alkaline earth metal hydroxide, for example sodium, potassium or barium hydroxide.

The starting material for the process of the invention may be obtained by the interaction of an alkanolamine derivative of the formula:

$$X-O-CH_2.CHOH.CHR^1.NR^3.CH_2.CHR^2-OH$$

or an aziridine of the formula:

wherein X, $R^1$, $R^2$ and $R^3$ have the meanings stated above, with an agent capable of replacing the terminal hydroxy radical of the alkanolamine derivative by the radical Z, wherein Z has the meaning stated above, or of opening the aziridine ring by addition of the radicals Z and $R^3$ across said ring. Thus, for example, when Z stands for a halogen atom, for example the chlorine atom, the aziridine derivative may be reacted with a hygrogen halide, for example hydrogen chloride; and when Z stands for a sulphonyloxy radical, the alkanolamine derivative may be reacted with chlorosulphonic acid, or with the sulphur trioxide-pyridine complex, or with a lower alkyl or aryl chlorosulphonate.

Alternatively, the starting material for the process of the invention may be prepared by the interaction of an epoxide of the formula:

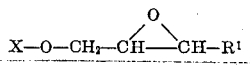

wherein X and $R^1$ have the meanings stated above, with a compound of the formula:

$$R^3NH-CH_2.CHR^2-Z$$

wherein $R^2$, $R^3$ and Z have the meanings stated above. The intermediate alkanolamine derivative may then be isolated and characterised before it is cyclised, or it may not be isolated but be prepared in situ and cyclised as it is formed.

It is to be understood that when a morpholine derivative wherein $R^3$ stands for an α-arylalkyl radical is obtained by the process of the invention, this compound may be converted into the corresponding compound wherein $R^3$ stands for hydrogen as described in United Kingdom Specification No. 1,138,405.

A preferred group of compounds which possess thymoleptic activity and which may be prepared by the process of the invention comprises compounds of the first formula given above wherein $R^1$ and $R^2$ both stand for hydrogen, wherein $R^3$ stands for hydrogen, or for an alkyl radical or not more than 3 carbon atoms, or for the allyl radical, and wherein X stands for a phenyl radical which bears a single substituent in the 2-position of the nucleus, and the acid-addition salts thereof. Suitable substituents in the 2-position are, for example, those substituents mentioned above as optional substituents in the phenyl or naphthyl radical X. Particularly preferred compounds of this group have the first formula given above wherein $R^1$, $R^2$ and $R^3$ all stand for hydrogen and wherein X stands for a phenyl radical which bears as single substituent in the 2-position a halogen atom, for example the chlorine atom, or an alkyl, alkoxy or alkenyloxy radical each of not more than 6 carbon atoms, for example the methyl, ethyl, methoxy, ethoxy, n-propoxy or allyloxy radical, or the phenyl or phenoxy radical.

The particularly preferred compound which possesses thymoleptic activity is 2-(o-ethoxyphenoxymethyl)morpholine.

The particularly preferred compound which possesses central nervous depressant activity and which may be prepared by the process of the invention is 2-(m-methoxyphenoxymethyl)morpholine.

Other particular morpholine derivatives which may be prepared by the process of the invention are, for example, 4-isopropyl-2-(napth-1-yloxymethyl)morpholine; 4-isopropyl-2-(m-tolyloxymethyl)morpholine; 2-(naphth-1-yloxymethyl)-4t-butylmorpholine; 2-o-ethoxyphenoxymethyl-4-isopropylmorpholine; 2-(naphth-1-yloxymethyl)morpholine; 4-allyl-2-(naphth-1-yloxymethyl)morpholine; 4-methyl-2-(naphth-1-yloxymethyl)morpholine; 2-(o-methoxyphenoxymethyl)morpholine; 2-(o-phenoxyphenoxymethyl)morpholine; 2-(o-tolyloxymethyl)morpholine; 2-(o-n-propoxyphenoxymethyl)morpholine; 2-phenoxymethylmorpholine; 2(p-methoxyphenoxymethyl)morpholine; 2-(2,6-dimethoxyphenoxymethyl)morpholine; 2-(o-hydroxyphenoxymethyl)morpholine; 2-(o-n-heptyloxyphenoxymethyl)morpholine; 2-(o-isopropoxyphenoxymethyl)morpholine; 2-(o-allyloxyphenoxymethyl)-4-isopropylmorpholine; 2-(o-allyloxyphenoxymethyl)morpholine; 4-cyclopentyl-2-(napth-1-yloxymethyl)morpholine; 4-isopropyl-2-(5,6,7,8-tetrahydronaphth-1-yloxymethyl)morpholine; 4-isopropyl-2-(3,4-methylenedioxyphenoxymethyl)morpholine; 2-(4-indanyloxymethyl)-4-isopropylmorpholine; 4-isopropyl-2-(m-trifluoromethylphenoxymethyl)morpholine; 4-allyl-2-(o-ethoxyphenoxymethyl)morpholine; 2-(4-biphenylyloxymethyl)-4-isopropylmorpholine; 2-(o-chlorophenoxymethyl)-4-isopropylmorpholine; 2-(o-ethoxyphenoxymethyl)-3-methylmorpholine; 4-isopropyl-6-methyl-2-(naphth-1-yloxymethyl)morpholine; 2-(o-chlorophenoxymethyl)morpholine; 2-(o-methylthiophenoxymethyl)morpholine; 2-(o-allylphenoxymethyl)morpholine; 2-(o-phenylphenoxymethyl)morpholine; 2-(m-tolyloxymethyl)morpholine; 2-(5,6,7,8-tetrahydronaphth-1-yloxymethyl)morpholine; 2-(m-chlorophenoxymethyl)morpholine; 2-(m-phenoxyphenoxymethyl)morpholine; 2-(3,5-dimethylphenoxymethyl)morpholine; 2(2,5-dimethylphenoxymethyl)morpholine; 2-(m-ethoxyphenoxymethyl)morpholine; 2-(p- chlorophenoxymethyl)morpholine; 2-(2,4-dichlorophenoxymethyl)-4-isopropylmorpholine; 2-phenoxymethyl-4-isopropylmorpholine; 2-(m-chlorophenoxymethyl)-4-isopropylmorpholine and 2-(o-bromophenoxymethyl)-4-isopropylmorpholine and the acid-addition salt thereof.

The 13 last-mentioned compounds described above are novel compounds not particularly disclosed in United Kingdom Specification No. 1,138,405, and these thirteen compounds form therefore a further feature of the present invention.

The invention is illustrated but not limited by the following Examples:

EXAMPLE 1

A mixture of crude (83%), 1,2-epoxy-3-(o-ethoxyphenoxy)propane (19.4 g.), 2-aminoethyl hydrogen sulphate (70.5 g.), sodium hydroxide (40.0 g.), ethanol (400 ml.) and water (200 ml.) is stirred at 60°C. for 18 hours and is then evaporated to dryness. The residue is dissolved in water (200 ml.) and the mixture is extracted three times with 150 ml. of diethyl ether each time. The combined extracts are dried over magnesium sulphate and evaporated to dryness. The crude product (21.5 g.) is dissolved in isorpopanol (20 ml.), concentrated aqueous hydrochloric acid (10.5 ml.) and ethyl acetate (75 ml.) are added and the mixture is cooled. The mixture is filtered and there is thus obtained as solid product 2-(o-ethoxyphenoxymethyl)morpholine hydrochloride, m.p. 179°–182°C. (8.6 g.; 38% yield based on total epoxide used).

EXAMPLE 2

A mixture of crude (83%) 1,2-epoxy-3-(o-ethoxyphenoxy)propane (10 g.), 2-chloroethylamine hydrochloride (23.2 g.), sodium hydroxide (20 g.), ethanol (200 ml.) and water (100 ml.) is kept at 60°–65°C. for 24 hours. The reaction mixture is acidified with concentrated aqueous hydrochloric acid, the ethanol is removed by distillation and the residual aqueous solution is extracted with ethyl acetate (100 ml.), the extract being discarded. The aqueous layer is basified with aqueous sodium hydroxide solution and extracted twice with ether (200 ml. each time). The combined extracts are dried with anhydrous magnesium sulphate and then evaporated to dryness. There is thus obtained a crude base (6.0 g.), 2.0 g. of which is chromatographed on silica gel (100 g.) using firstly chloroform, and secondly a 10% v/v solution of methanol in chloroform, as eluant. The course of the elution is followed by thin layer chromatography. The appropriate fractions of the eluate are combined and evaporated to dryness and the residue is dissolved in ethyl acetate (15 ml.). A 10% w/v solution of hydrogen chloride in isopropanol is added dropwise until the solution is acidic, and the solution is cooled and filtered. There is thus obtained 2-(o-ethoxyphenoxymethyl)morpholine hydrochloride, m.p. 179°–183°C. (0.35 g.).

EXAMPLE 3

Pyridine (25 ml.) is stirred and cooled to 5°C. and chlorosulphonic acid (3.5 ml.; 5.9 g.) is added dropwise, the temperature being maintained below 10°C. A solution of 1-(o-ethoxyphenoxy)-3-β-hydroxyethylamino-2-propanol (12.5 g.) in pyridine (25 ml.) is added, and the mixture is kept at 25°C. for 3 hours and then evaporated to dryness under reduced pressure.

The 2-[3-(o-ethoxyphenoxy)-2-hydroxypropyl]aminoethyl hydrogen sulphate obtained as an oil is added to a solution of sodium hydroxide (6 g.) in ethanol (66 ml.) and water (33 ml.) and the mixture is heated under reflux for 24 hours. The ethanol is removed by distillation, water (100 ml.) is added and the mixture is extracted three times with ether (75 ml. each time). The combined extracts are dried over anhydrous magnesium sulphate and evaporated to dryness. The residual oil is dissolved in isopropanol (5 ml.), concentrated aqueous hydrochloric acid (2.2 ml.) and ethyl acetate (200 ml.) are added and the mixture is cooled and then filtered. There is thus obtained 2-(o-ethoxyphenoxymethyl)morpholine hydrochloride, m.p. 185°C. (2.65 g.).

The 1-(o-ethoxyphenoxy)-3-β-hydroxyethylamino-2-propanol used as starting material may be obtained as follows:

Ethanolamine (80 ml.) is stirred and heated to 50°C. and crude (83%) 1,2-epoxy-3-(o-ethoxyphenoxy)propane (34.5 g.) is added dropwise, the temperature being maintained below 65°C. The mixture is kept at 60°C. for 2 hours and is then cooled, dilute aqueous hydrochloric acid is added until the pH of the mixture is 2, and the mixture is extracted with ethyl acetate (250 ml.), the extract being discarded. The aqueous solution is basified with aqueous sodium hydroxide solution and extracted three times with ethyl acetate (100 ml. each time). The combined extracts are dried over anhydrous magnesium sulphate and evaporated to dryness and the residue is crystallised from a mixture of ethyl acetate and petroleum ether (b.p. 40°–60°C.). There is thus obtained 1-(o-ethoxyphenoxy)-3-β-hydroxyethylamino-2-propanol, m.p. 75°–77°C. (21 g.).

EXAMPLE 4

A solution of crude (86.1%) 1,2-epoxy-3-(m-methoxyphenoxy)propane (52.3 g.) in methanol (250 ml.) is added to a solution of 2-aminoethyl hydrogen sulphate (352.5 g.) in 70% w/v aqueous sodium hydroxide solution (141 ml.) and the mixture is vigorously stirred at 55°C. for 1 hour. Further 70% w/v aqueous sodium hydroxide solution (250 ml.) is added and the mixture is vigorously stirred at 55°C. for 12 hours. Toluene (500 ml.) and water (1 litre) are added, the mixture is vigorously stirred, and the toluene layer is separated and extracted with aqueous 2-N-sulphuric acid (500 ml.). The acidic extract is made alkaline with aqueous sodium hydroxide solution and the mixture is extracted twice with toluene (300 ml. each time). The combined toluene extracts are washed with water and evaporated to dryness under reduced pressure and the residue (50.3 g.) is distilled. There is thus obtained 2-(m-methoxyphenoxymethyl)morpholine (41.3 g.; 74% yield based on total epoxide used), b.p. 114°C./0.02 mm.

EXAMPLE 5

A solution of a 1,2-epoxy-3-(appropriately-substituted-phenoxy)propane (1 equivalent), 2-aminoethyl hydrogen sulphate (3 equivalents) and sodium hydroxide (3 equivalents) in a mixture of water (5 ml. for each g. of sodium hydroxide) and dioxan (8 ml. for each g. of sodium hydroxide) is heated under reflux for 90 minutes to give the 2-[3-(appropriately-substituted-phenoxy)-2-hydroxypropyl]aminoethyl hydrogen sulphate. Sodium hydroxide (10 equivalents in the form of a 70% w/v aqueous solution) is then added and the mixture is heated under reflux for 6 hours. The mixture is cooled and extracted twice with toluene, and the combined toluene extracts are extracted twice with aqueous 2N-sulphuric acid. The combined acidic extracts are made alkaline with aqueous sodium hydroxide solution and the mixture is extracted twice with toluene. The combined toluene extracts are washed with water and the toluene is removed by evaporation under reduced pressure. The residue is dissolved in ethyl acetate and the solution is chromatographed on a silica gel column, using firstly ethyl acetate and secondly a mixture of ethyl acetate and ethanol (4:1 v/v) as eluant. The progress of the elution is followed by thin-layer chromatography and the appropriate fractions of the eluate are combined and evaporated to dryness. The residue is dissolved in methanol and the solution is added to a solution of oxalic acid in methanol. Ethyl acetate is added and the mixture is cooled until crystallisation is complete. The mixture is filtered and the solid product is washed with ethyl acetate and dried.

The following 2-aryloxymethylmorpholine hydrogen oxalate salts are obtained by the general method described above:

| aryloxy group | m.p. (°C.) |
|---|---|
| o-methylphenoxy | 119 |
| o-chlorophenoxy | 143 |
| p-chlorophenoxy | 164 |
| naphth-1-yloxy | 161 |
| o-methylthiophenoxy | 174–177 |
| o-benzyloxyphenoxy | 164–167 |

The 1,2-epoxy-3-(appropriately-substituted-phenoxy)propae used as starting material may be obtained as follows:

A solution of an appropriately-substituted phenol (1 equivalent), epichlorohydrin (1.5 equivalents) and sodium hydroxide (1.2 equivalents) in water (10 ml. for each g. of sodium hydroxide) is stirred at 20°C. for 16 hours. The mixture is extracted twice with ethylene dichloride and the combined extracts are dried and evaporated to dryness. The crude epoxide obtained as oily residue is used without further purification. The amount of epoxide in the crude material may be calculated by adding a known quantity of a solution of aqueous hydrochloric acid in dioxan to an aliquot of the crude epoxide, and estimating the amount of hydrochloric acid used by titration of the excess of hydrochloric acid against methanolic sodium hydroxide solution.

EXAMPLE 6

A solution of sodium hydroxide (12 g.) in water (50 ml.) is added dropwise to a suspension of 2-methylaminoethyl hydrogen sulphate (21.3 g.) and 1,2-epoxy-3-(o-ethoxyphenoxy)propane (10 g.) in ethanol (100 ml.) and the mixture is stirred and heated under reflux for 24 hours. The mixture is cooled and acidified with aqueous hydrochloric acid, the ethanol is removed by evaporation under reduced pressure, and water (100 ml.) is added. The mixture is filtered and the filtrate is washed with ethyl acetate (100 ml.) and then made alkaline with aqueous sodium hydroxide solution. The mixture is extracted twice with ethyl acetate (100 ml. each time) and the combined extracts are dried and evaporated to dryness. The residue is dissolved in ethyl acetate and a solution of hydrogen chloride in isopropanol is added until an excess of acid is present. The mixture is cooled and filtered, and the solid product is washed with ethyl acetate and dried. There is thus obtained 2-(o-ethoxyphenoxymethyl)-4-methylmorpholine hydrochloride, m.p. 137°C.

EXAMPLE 7

A mixture of 1,2-epoxy-3-(o-ethoxyphenoxy)propane (3.0 g.), 2-benzylaminoethyl hydrogen sulphate (11.6 g.), sodium hydroxide (2.0 g.), ethanol (20 ml.) and water (7.5 ml.) is heated under reflux for 90 minutes. A solution of sodium hydroxide (2.0 g.) in water (5 ml.) is added and the mixture is heated under reflux or 16 hours. The solution is cooled, water (60 ml.) is added and the mixture is extracted twice with ethyl acetate (100 ml. each time). The combined extracts are extracted twice with aqueous 2N-hydrochloric acid (50 ml. each time) and the combined extracts are made alkaline with aqueous sodium hydroxide solution and then extracted twice with ethyl acetate (50 ml. each time). The combined extracts are dried and evaporated to dryness, and the residue (6.0 g.) is dissolved in ethyl acetate and chromatographed on a silica gel column using ethyl acetate as eluant. The progress of the chromatography is followed by thin-layer chromatography and the appropriate fractions of the eluate are combined and evaporated to dryness. The residue (1.2 g.) is dissolved in methanol (30 ml.) and the solution is added to a solution of oxalic acid (0.4 g.) in methanol (30 ml.). Ethyl acetate is added and the mixture is cooled and filtered. The solid product is washed with ethyl acetate and dried and there is thus obtained 4-benzyl-2-(o-ethoxyphenoxymethyl)morpholine hydrogen oxalate, m.p. 163°–167°C.

The 2-benzylaminoethyl hydrogen sulphate used as starting material may be obtained as follows:

A mixture of 2-benzylaminoethanol (30.2 g.) and sulphuric acid (19.6 g.) is heated at 160°C. under reduced pressure (15 m.m.) for 2 hours. The mixture is cooled, the solid residue is dissolved in water (30 ml.), methanol (300 ml.) is added and the mixture is heated under reflux until a clear solution is obtained. The solution is cooled and then filtered, and there is thus obtained as solid residue 2-benzylaminoethyl hydrogen sulphate (20 g.), m.p. 244°–246°C.

2-Aminoethyl hydrogen sulphate, a known compound, may also advantageously be obtained by a similar process from 2-aminoethanol.

EXAMPLE 8

The process described in Example 5 is repeated using the appropriate 1,2-epoxy-3-phenoxypropane and either 2-aminoethyl hydrogen sulphate or 2-isopropylaminoethyl hydrogen sulphate as starting materials, the product being converted into the appropriate hydrochloride or hydrogen oxalate salt by conventional means, and there are thus obtained the compounds described in the following table:

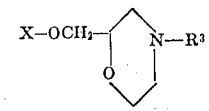

| X | R³ | salt | m.p. (°C.) | crystallisation solvent |
|---|---|---|---|---|
| 2-biphenylyl | hydrogen | hydrochloride | 159–163 | methanol/ethyl acetate |
| m-tolyl | hydrogen | hydrogen oxalate | 157–160 | methanol/ethyl acetate |
| m-chlorophenyl | hydrogen | hydrogen | 144–147 | methanol/ethyl acetate |
| m-chlorophenyl | isopropyl | hydrochloride | 179–182 | methanol/ethyl acetate |
| m-ethoxyphenyl | hydrogen | hydrogen | 155–157 | methanol/ethyl acetate |
| o-bromophenyl | isopropyl | hydrochloride | 171–174 | methanol/ethyl acetate |
| phenyl | isopropyl | hydrogen oxalate | 141–142 | methanol/ethyl acetate |
| m-phenoxyphenyl | hydrogen | hydrogen oxalate | 132–134 | ethanol |
| 5,6,7,8-tetrahydro-napth-1-yl | hydrogen | hydrogen oxalate | 186–189 | methanol/ethyl acetate |
| 2,5-dimethyl-phenyl | hydrogen | hydrogen oxalate | 118–119 | ethanol/ether |
| 3,5-dimethyl-phenyl | hydrogen | hydrochloride | 156–158 | methanol/ethyl acetate |
| 2,4-dichloro-phenyl | isopropyl | hydrogen oxylate | 125–127 | methanol/ethyl acetate |

EXAMPLE 9

A mixture of crude (81.5%) 1,2-epoxy-3-(o-ethoxyphenoxy)propane (47.6 g.), methanol (60 ml.), 2-aminoethyl hydrogen sulphate (141 g.) and 74% w/v aqueous sodium hydroxide solution (51 ml.) is stirred at 25°C. for 2 hours. The 2-[3-(o-ethoxyphenoxy)-2-hydroxypropyl]aminoethyl hydrogen sulphate thus formed as an intermediate is not isolated but is cyclised in situ by addition of a further quantity of sodium hydroxide solution (45 ml.) and heating with stirring to 50°C. for 25 hours. The reaction mixture is diluted with water and extracted with 3 portions of ether. The combined ether extract is washed with 50% w/v brine, dried over magnesium sulphate, and the ether evaporated under reduced pressure. The oily residue is treated with ethereal hydrogen chloride and the resulting solid (m.p. 180°C.) is recrystallised from ethanol to give 2-(o-ethoxyphenoxymethyl)morpholine hydrochloride, m.p. 186°–187°C.

EXAMPLE 10

The first part of Example 9 is repeated and the 2-[3-(o-ethoxyphenoxy)-2-hydroxypropyl]aminoethyl hydrogen sulphate formed as intermediate is isolated as follows:

The pH of the solution is adjusted to 6 with hydrochloric acid, the precipitated salt is filtered off and the filtrate is extracted with chloroform (2 × 100 ml.). The chloroform extract is shaken with water to give three layers. The middle layer is shaken with water and ethyl acetate, and the resulting lower layer is evaporated to dryness to give an oil which crystallises on trituration with acetone. The crude solid is heated under reflux with isopropanol (1.4 l.), the hot suspension is filtered and the filtrate allowed to cool. The crystalline precipitate which separates is recrystallised from isopropanol to give 2-[3-(o-ethoxyphenoxy)-2-hydroxypropyl]aminoethyl hydrogen sulphate, m.p. 164°C. (Found: C,46.7%; H.6.1%; N,4.0%; S,9.5%: $C_{13}H_{21}NO_7S$ requires C,46.8%; H.5.7%; N,4.2%; S,9.6%).

A mixture of 2-[3-(o-ethoxyphenoxy)-2-hydroxypropyl]aminoethyl hydrogen sulphate (2 g.), methanol (1.5 ml.) and 74% w/v aqueous sodium hydroxide solution (3.3 ml.) is heated at 50°C. with stirring for 25 hours. The reaction mixture is diluted with water and extracted with 3 portions of ether. The combined ether extract is washed with 50% w/v brine, dried over magnesium sulphate, and the ether evaporated under reduced pressure. The oily residue is treated with ethereal hydrogen chloride and the resulting solid is recrystallised from ethanol to give 2-o-ethoxyphenoxymethyl)morpholine hydrochloride, m.p. 186°–187°C.

In a similar manner the morpholine derivatives described in Examples 4 to 8 may be obtained from the corresponding 2-[3-(substituted phenoxy)-2-hydroxypropyl]aminoethyl hydrogen sulphate as starting material by cyclisation in the presence of a base, particularly sodium hydroxide.

What we claim is:

1. A process for the manufacture of morpholine derivatives selected from compounds of the formula:

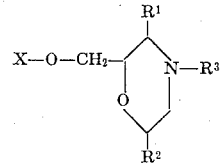

wherein $R^1$ is hydrogen, $R^2$ is hydrogen or alkyl of up to 3 carbon atoms, $R^3$ is hydrogen and X is phenyl or naphthyl which is unsubstituted or phenyl which is substituted by one or two substituents selected from halogen, alkyl, alkoxy and alkylthio each of up to 10 carbon atoms, trifluoromethyl, alkenyl and alkenyloxy each of up to 6 carbon atoms, phenyl, phenoxy, benzyloxy, hydroxy, indanyl or tetrahydronaphthyl, and the acid-addition salts thereof, which comprises the step of cyclising a compound of the formula:

wherein X, $R^1$, $R^2$ and $R^3$ have the meanings stated above and wherein Z is chlorine or bromine or a substituent of the formula $—OSO_2OR^4$, wherein $R^4$ is hydrogen, methyl, ethyl, phenyl or p-tolyl, or an acid-addition salt thereof, in a diluent or solvent at a temperature of between 0° and 100°C., and in the presence of a base.

2. A process as claimed in claim 1 wherein the diluent or solvent is water, an alcohol, an ether or an aromatic hydrocarbon, or a mixture of any of the above-mentioned solvents.

3. A process as claimed in claim 1 which is carried out at a temperature of between 40° and 60°C.

4. A process as claimed in claim 1 wherein the base is an alkali or alkaline earth metal hydroxide.

5. A process as claimed in claim 1 wherein in the starting materials $R^1$, $R^2$ and $R^3$ all stand for hydrogen and X stands for the o-ethoxyphenyl radical.

6. A process as claimed in claim 1 wherein in the starting materials $R^1$, $R^2$ and $R^3$ all stand for hydrogen and X stands for the m-methoxyphenyl radical.

* * * * *